United States Patent [19]

Schneider

[11] 4,442,430

[45] Apr. 10, 1984

[54] IDENTIFICATION TECHNIQUE FOR AIR TRAFFIC

[76] Inventor: Bernard A. Schneider, 8984 Bellefontaine Rd., Dayton, Ohio 45424

[21] Appl. No.: 262,713

[22] Filed: May 11, 1981

[51] Int. Cl.³ ............................................. G01S 13/78
[52] U.S. Cl. ................................................. 343/6.5 R
[58] Field of Search ........................ 343/6.5 R, 6.5 LC

[56] References Cited

U.S. PATENT DOCUMENTS

| | | | |
|---|---|---|---|
| 3,418,581 | 12/1968 | Kennedy et al. | 343/6.5 R X |
| 3,699,570 | 10/1972 | Hanson et al. | 343/6.5 R X |
| 3,997,898 | 12/1976 | Le Grand | 343/6.5 R |
| 4,010,465 | 3/1977 | Dodington et al. | 343/6.5 LC X |
| 4,145,690 | 3/1979 | Petitjean et al. | 343/6.5 R |
| 4,161,729 | 7/1979 | Schneider | 343/6.5 R |

Primary Examiner—T. H. Tubbesing
Attorney, Agent, or Firm—Donald J. Singer; Bernard E. Franz

[57] ABSTRACT

The ITAT technique, embodied in ITAT hardware, provides a means to add additional operating modes to interrogator-transponder (beacon) systems in a relatively simple and economical manner. The technique permits the adding of special modulation to the normal pulse-coded transmissions for the purpose of providing a security identification code, or a digital wavefore enabling high processing gain, or both.

Two similarly designed ITAT units are required; one for interrogator systems, and one for transponder systems. Both units simply connect between the respective system units and the system antennas.

The ITAT units operate in two modes; "Normal" and "ITAT." In the normal mode, the units do not interfere with operation of the transponder-interrogator (beacon) system. In the ITAT mode, the units suppress the beacon system operating range by introducing attenuation between the interrogator unit (or transponder unit) and the antenna. In effect, normal operation is blocked during ITAT operation. In place of normal operation, the ITAT unit specially-modulates interrogator pulse-coded emissions to add special ITAT modulation. The ITAT receiver collocated with transponders detects and decodes ITAT interrogations and passes the pulse-code information to the transponder. When the transponder replies, ITAT modulation is added to the transmission. The ITAT receiver at the interrogator unit receives ITAT-modulated replies, decodes the information, and passes the reply code signals to the interrogator unit.

5 Claims, 4 Drawing Figures

IDENTIFICATION TECHNIQUE FOR AIR TRAFFIC

RIGHTS OF THE GOVERNMENT

The invention described herein may be manufactured and used by or for the Government of the United States for all governmental purposes without the payment of any royalty.

BACKGROUND OF THE INVENTION

This invention relates to interrogator-transponder systems, including identification coding on the transmissions.

At the present day, both the Federal Aviation Agency (FAA) and the Department of Defense (DOD) use the air traffic radar beacon system (ATCRBS) as the primary means of controlling U.S. air traffic. The ATCRBS network consists of nearly 700 ground stations, 184,000 aircraft transponders, and 108,000 altitude encoders for Mode C altitude reporting. It is estimated that DOD owns 108,000 transponders. The U.S. ATCRBS hardware is compatible with the Secondary Surveillance Radar (SSR) international air traffic control system governed by the International Civil Aviation Organization (ICAO).

Interrogator-transponder beacon systems are also used for Identification Friend or Foe (IFF) systems.

A transponder is a device that produces an active output signal in response to an incoming interrogation signal. Transponders adapted to be carried on aircraft or other vehicles respond to signals received from other station transmitters and provide reply signals which are received by the receiver at the originating station. It is desired to code the reply signals with specified pulse formats so that the signal received at the originating station identifies the particular aircraft or vehicle from which the reply is received, or to convey other information. In some applications a simple two-pulse reply is provided, with the spacing between the two pulses identifying the different transponders. See for example U.S. Pat. No. 4,129,867. Other modulation techniques are also used. Other U.S. patents of interest include my U.S. Pat. No. 4,161,729 for a Beacon Add-On Subsystem for Collision Avoidance System, hereby incorporated by reference, and U.S. Pat. No. 4,090,196 for an Inverse Gain Modulator.

SUMMARY OF THE INVENTION

An object of the invention is to provide a means to add additional operating modes to interrogator-transponder (beacon) systems in a relatively simple and economical manner.

The technique according to the invention permits the adding of special modulation to the normal pulse-coded transmissions. Two similarly designed units are required—one for interrogator systems and one for transponder systems. Both units simply connect between the respective system units and the system antennas.

The technique permits adding of special operating modes and waveforms to transponder-interrogator (beacon) systems without system modifications except to add a small ITAT (Identification Technique for Air Traffic) receiver-decoder unit in the cabling line to the antenna, and a small control unit. It permits the addition of secure identification to beacon systems, or the addition of waveforms possessing high processing gain.

DETAILED DESCRIPTION

The ITAT technique, embodied in ITAT hardware, provides a means to add additional operating modes to interrogator-transponder (beacon) systems in a relatively simple and economical manner. Typical systems which might benefit by having additinal air traffic positive identification means would be the U.S. Air Traffic Control Radar Beacon System or the Secondary Surveillance Radar System. The ITAT technique permits the adding of special modulation to the normal pulse amplitude-modulated, pulse-coded emissions to provide either a security identification code, or a digital waveform enabling high processing gain, or both.

Figure 1:
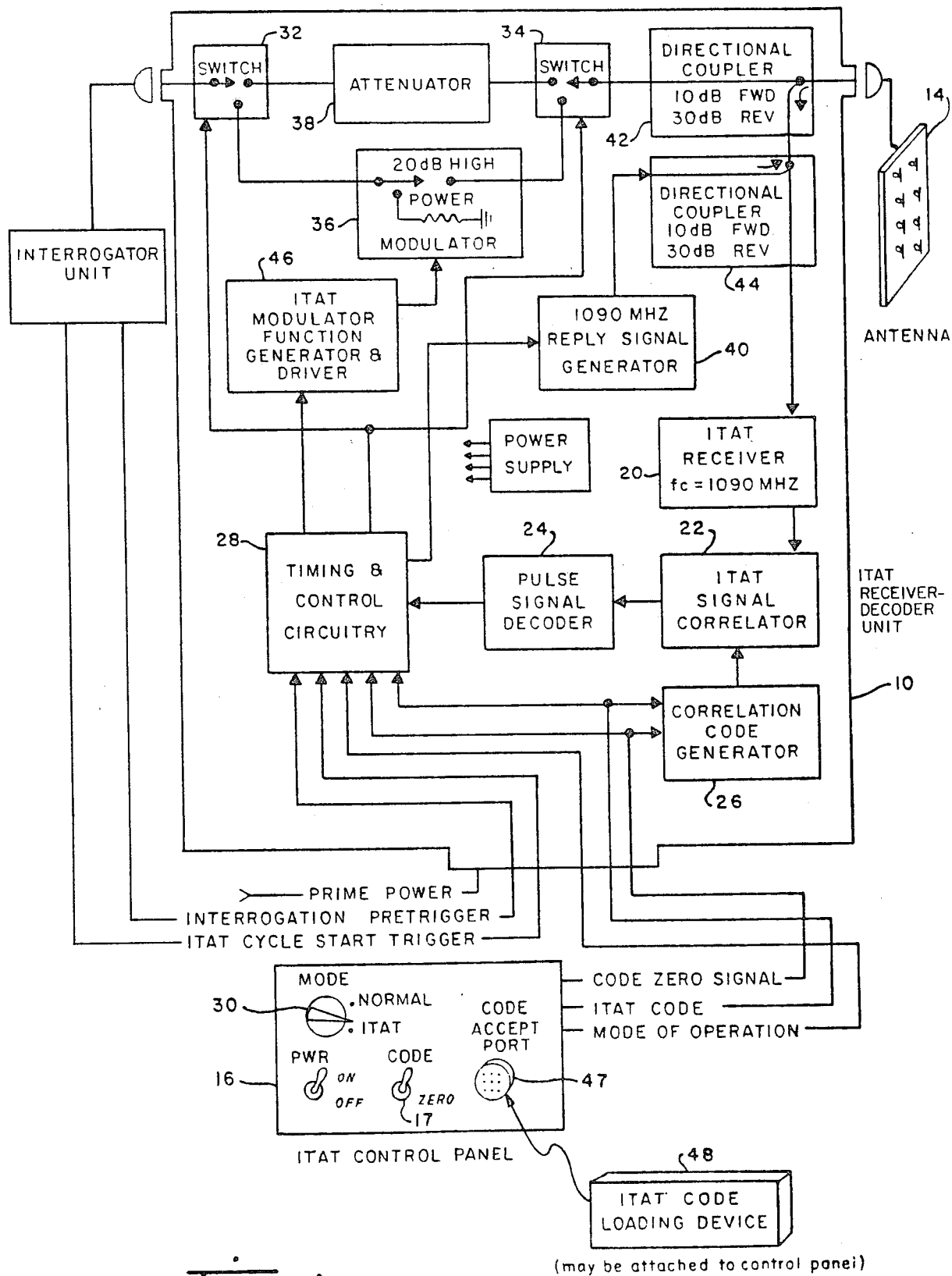
FIG. 1 is a block diagram of an ITAT Unit for interrogator systems.

FIG. 1 shows an ITAT unit for the associated interrogator system. The small ITAT receiver-decoder unit 10 is simply connected in series between the inerrogator unit 12 and the interrogator antenna 14. The ITAT control panel 16 is physically small and can be located at any convenient place.

Figure 2:
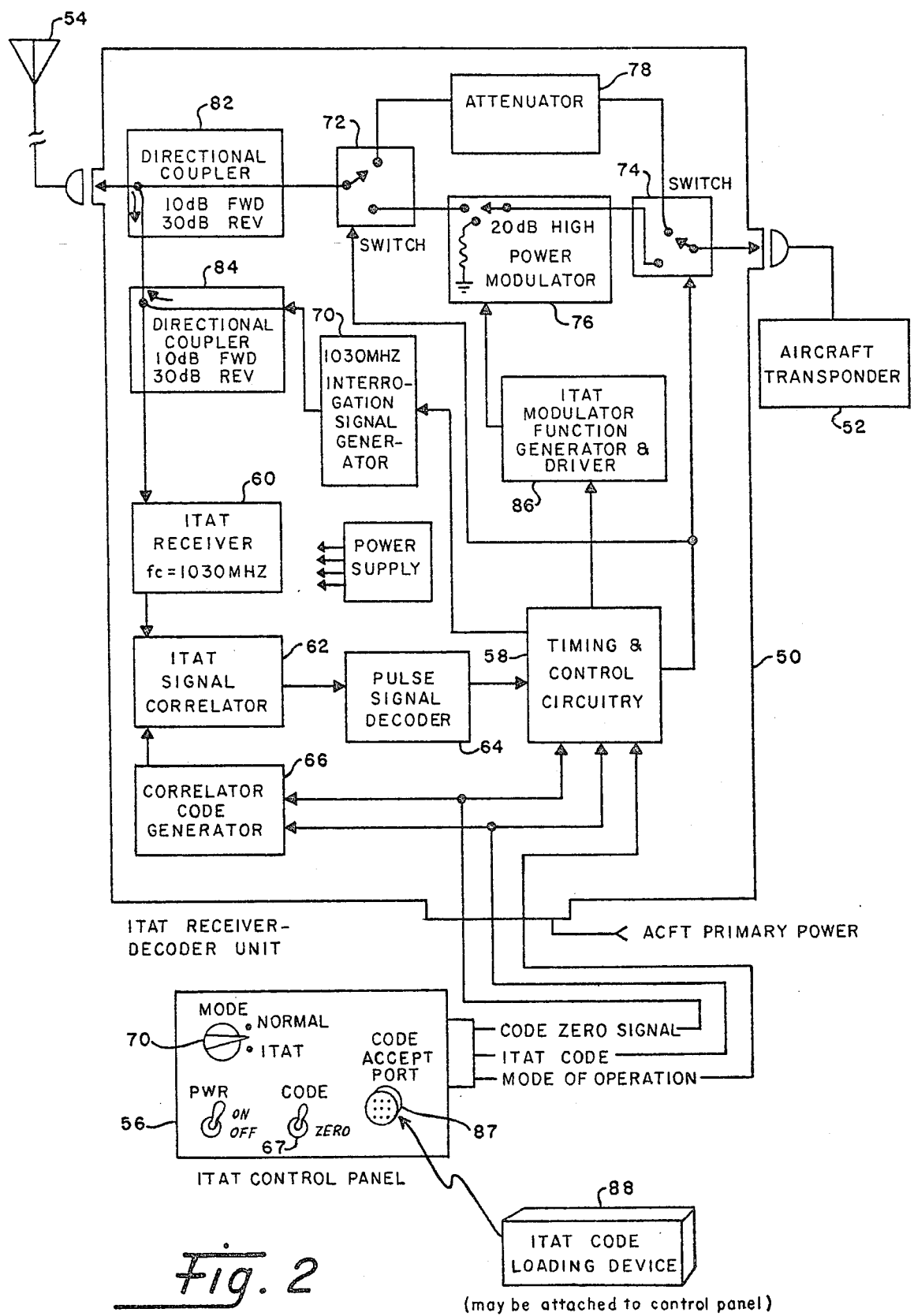
FIG. 2 is a block diagram of an ITAT unit for transponder systems.

FIG. 2 shows an ITAT unit for the associated transponder (beacon) system. The small ITAT receiver-decoder unit 50 is simply connected in series between the transponder unit 52 and the transponder antenna 54. The ITAT control panel 56 can be conveniently located.

Both types of ITAT units (for the interrogator system and for the transponder system) have two selectable operating modes. In the "NORMAL" mode, the ITAT unit does not perform the ITAT function and permits normal operation of the associated secondary radar or beacon system. In the "ITAT" mode, the unit places signal attenuation into the reception path of the associated unit (transponder or interrogator) causing reduced system operating range during normal mode operation. It also adds desired modulation to system emissions which provide security or improved performance. These special signals are detected by ITAT receivers at other stations. During ITAT mode operation, the ITAT emission from a station is detected and decoded by the ITAT receiver-decoder unit at other stations. Upon receiving an ITAT interrogation, an ITAT-equipped transponder system would employ the ITAT apparatus to decode the ITAT interrogation and respond with an ITAT modulated reply.

DESCRIPTION of ITAT Unit for Interrogator Systems

A description of the functional elements of an ITAT unit for interrogator systems (FIG. 1) is provided as follows:

a. ITAT Receiver

A receiver 20 is designed according to the special ITAT modulation waveforms being used. If the ITAT modulation waveform being used is a spread spectrum waveform (produced through PSK modulation), the receiver for the ITAT unit would be of an appropriate design which would receive the special ITAT spread spectrum signal energy. The receiver center frequency would be tuned to receive the normal system rf pulses (i.e., tuned to 1090 MHz for the ATCRBS or SSR systems), and would have sufficient bandwidth to receive the ITAT—modulated pulse signal energy. Signal sensitivity of the receiver would be roughly 0 dB to 10 dB more sensitive than the associated interrogator system receiver. Consideration must be given to the 10 dB signal loss provided in the directional coupler 42 in the ITAT receiving path.

b. ITAT Signal Correlator

A signal correlator 22 (matched filter) is designed to detect the ITAT-modulated pulse signal provided at baseband frequency by the ITAT receiver.

c. Pulse Signal Decoder

The pulse signal decoder 24 decodes the baseband pulse code from incoming beacon signals after the ITAT modulation has been detected by the signal correlator 22.

d. Correlation Code Generator

A generator 26 designed to provide the necessary inputs to the ITAT signal correlator 22 to establish the proper correlation function for decoding the ITAT modulation. The code generator accepts the ITAT code which has been loaded at the ITAT control panel 16. It generates the proper signal correlation function to enable matched-filter detection of the incoming ITAT-modulated reply pulses.

e. Timing and Control Circuitry

The timing and control circuitry 28 provides the necessary timing, control, & coding functions to control operation of other elements of the ITAT unit. The T&C circuitry is designed to recognize the incoming transponder reply pulse codes coming from the pulse signal decoder 24. In an example wherein ITAT is used in mode 3/A of the ATCRBS system, the T&C circuitry would receive pulses from the pulse signal decoder which are Mode 3/A reply pulse trains. Since the interrogator unit 12 receiver cannot recognize incoming transponder replies that have added ITAT modulation, it is necessary for the ITAT unit to receive these replies and reconstitute the signals into a form that can be used by the interrogator unit receiver. After the ITAT T&C circuitry recognizes a transponder reply pulse train, it generates a coded signal to the 1090 MHz (for ATCRBS or SSR) reply signal generator unit 40. A recognizable radio-frequency reply signal is thus generated and passed through the ITAT unit to the interrogator unit receiver.

The T&C circuitry also generates command signals to the ITAT modulator function generator and driver circuit 46 to cause, when an "ITAT cycle start trigger" and an "interrogation pretrigger" are received, a modulation function which adds special desired ITAT modulation onto any interrogation signal emanating from the associated interrogator unit.

When the ITAT control box "mode" switch 30 is set to "Normal," the T&C circuitry commands the two ITAT coaxial switches 32, 34 to rest in the position where rf signals from the interrogator unit 12 are routed through the high power modulator 36. In the "Normal" mode, the T&C circuitry also inhibits modulator 36 operation so that no ITAT modulation occurs and no signal loss is incurred. In this manner, the ITAT unit allows normal operation of the associated system interrogator.

When the "ITAT" mode is selected, the T&C circuitry causes the two coaxial switches 32, 34 to switch to the attenuator path 38 whenever there is no presence of a "ITAT cycle start trigger." The attenuator effectively reduces the interrogator unit 12 reception sensitivity. This causes desensitization to normal system reply signals or to interferring signals. The attenuation value would be determined by the system designer for the intended purpose. In the "ITAT" mode, if a "ITAT cycle start trigger" signal is received from the associated interrogator unit 12 (indicating that an ITAT interrogation cycle is desired) and an "interrogation pretrigger" is received, the T&C circuitry causes the coaxial switches 32, 34 to throw to the modulator path. The modulator is also commanded to begin ITAT operation.

After completing ITAT modulation of an interrogation during an ITAT cycle, the T&C circuitry again causes the switches 32, 34 to throw to the attenuator path 38, thereby inserting attenuation into the interrogator receiver path. The added attenuation insures that incoming transponder reply signals are received by the ITAT receiver rather than the interrogator receiver.

In an interrogator unit 12 such as found in the ATCRBS, the timing of an interrogation is adjusted so that transponder replies occur at the proper instant to truely reflect target actual range. This is necessary because certain signal processing time delays are inherent in a beacon system. The ITAT unit associated with an interrogator unit also introduces some additional small time delay (of a fixed amount) into the time of arrival of target replies at the interrogation unit. During an ITAT cycle, the ITAT unit must first receive and process ITAT-modulated incoming replies and then must generate non-ITAT-modulated replies for the interrogator unit which will be recognizable. In the case of ATCRBS Mode 3/A operation, the additional time delay would be approximately 3 to 25 microseconds. This additional time delay may or may not be objectionable to operation of the interrogator unit. If it is, the timing of an interrogation from the interrogator unit during an ITAT cycle would need to be offset to compensate for the added time delay caused by ITAT operation.

f. (1090 MHz) Reply Signal Generator

A generator 40 provides an rf reply signal of the type that can be recognized by the associated interrogator unit. For ATCRBS, the reply signal generator would be a low-power oscillator operating at 1090 MHz. The signal generator peak pulse rf power level would be adequate to overcome the 10 dB and 30 dB losses in the directional couplers 42 and 44 and the attenuator 38 and would be sufficient to be detected by the interrogator unit. Modulation of the reply signal generator output would be provided by the timing & control circuitry 28.

g. Directional Coupler(s)

Two directional couplers 42 and 44 are used. Both are designed for 0.5–1.0 dB insertion loss in the direct path. 10 dB coupling in the forward direction is provided to the coupled port, 30 dB coupling is provided for signals flowing in the reverse direction toward the input port of the coupler. One directional coupler 44 serves to couple the reply signal generator 40 into the ITAT receiver path with 10 dB isolation of reply signal generator signals toward the ITAT receiver. The other directional coupler 42 couples incoming reply signals from the interrogator antenna 14 to the ITAT receiver 20, providing 10 dB coupling. It decouples interrogator transmissions from the ITAT receiver by 30 dB to prevent damage to the ITAT receiver.

h. Attenuator 38

This is a conventional attenuator, either fixed-value or variable-value. Choice and value would be selected by the ITAT system designer.

i. Switch(es) 32 and 34

These are conventional design high-speed, solid-state, high-power switches. Switch design and power rating are chosen by ITAT system designer.

j. High Power Modulator 36

This is a conventional design modulator capable of modulating high-power radio frequency signals (see FIG. 11 of U.S. Pat. No. 4,161,729 for example). In the case where simple ON-OFF keying is the desired ITAT modulation for interrogation pulses, the modulator would be a PIN switch arrangement using $\lambda/4$ tuning paths. In the OFF position, the rf energy would be shunted to a high power load rather than being transmitted. A PIN switch arrangement can typically provide 20 dB down-modulation of peak rf power. In the case where a PSK spread-spectrum signal is desired, the modulator would be designed to modulate the rf pulses such that a wide-spectrum signal is generated. A technique commonly used to introduce signal phase shift is to rapidly switch a fixed phase shift component in and out of the transmission path via a PIN switch arrangment.

k. ITAT Modulator Function Generator and Driver

The function generator and modulator driver 46 is of conventional design and provides the ITAT modulation code energizing signal to the high-power modulator 36. The driver circuits would provide sufficient drive levels to operate the modulator.

l. ITAT Control Panel

The control panel 16 is small and simple and provides the necessary controls to operate the ITAT receiver-decoder unit 10. The "mode" switch 30 allows selection of "Normal" and "ITAT" modes. The power switch energizes the ITAT apparatus. The "CODE" switch 17 allows the operator to erase the ITAT modulation code, if desired. The "Code accept port" 47 provides a means for the operator to insert the ITAT modulation code.

m. ITAT Code Loading Device 48

The means and apparatus to load and store the ITAT code can be decided by the system designer. The coding device could simply be a pre-punched plastic card which is inserted into a code reader/sensor in the ITAT control panel. Other techniques could also be used.

DESCRIPTION OF ITAT UNIT FOR TRANSPONDER (BEACON) SYSTEMS

The functional elements of an ITAT unit for transponder systems (FIG. 2) is very similar to an ITAT unit for interrogator system (FIG. 1). However, the circuit elements are slightly rearranged and reconfigured to perform the ITAT function for a transponder system. Highlights of the ITAT elements are as follows:

a. ITAT Receiver 60

Equivalent to the receiver 20 in the ITAT unit for the interrogator system (FIG. 1).

b. ITAT Signal Correlator 62

Equivalent to correlator 22 used for the ITAT unit for the interrogator system (FIG. 1).

c. Pulse Signal Decoder 64

Equivalent to decoder 24 used for the ITAT unit for interrogator systems (FIG. 1).

d. Correlation Code Generator 66

Equivalent to code generator 26 used for the ITAT unit for the interrogator system (FIG. 1).

e. Timing & Control Circuitry 58

Similar in design to circuitry 28 used for the ITAT unit for the interrogator system. It recognizes baseband incoming pulse codes from the pulse signal decoder 64. It reconstitutes the incoming interrogation code into a form that can be detected by the transponder 52 receiver and sends a coded command signal to the interrogation signal generator 70 for generating this signal.

The T&C circuitry activates the high power modulator 76 and modulator function generator 86 to provide ITAT modulation of the transponder 52 reply signal.

In the "Normal" mode of operation, the T&C circuitry throws switches 72, 74 to the modulator path 76 and deactivates the modulator 76. This provides normal transponder operation when ITAT operation is not desired. The modulator has no effect on transponder 52 signals.

In the "ITAT" mode of operation, the T&C circuitry throws switches 72, 74 to the attenuator 78 position thereby reducing the overall sensitivity of the transponder 52 system to normal incoming interrogations or unwanted interference. The radio frequency path to the ITAT receiver 60 is available to receive special ITAT-modulated interrogations.

f. (1030 MHz) Interrogation Signal Generator 60

This is similar in design and function to the reply signal generator 40 in the ITAT unit for interrogator systems (FIG. 1). The frequency of operation would be that necessary to interrogate the associated transponder system, which for ATCRBS or SSR would be 1030 MHz.

g. Directional Coupler(s) 82 and 84

These are identical in design to those used in the ITAT unit for interrogator systems (FIG. 1).

h. Attenuator 78 & Switch(es) 72, 74

These are identical in design to those used in the ITAT unit for interrogator systems (FIG. 1).

i. High Power Modulator 76

This is identical in design to that used in the ITAT unit for interrogator systems (FIG. 1).

j. ITAT Modulator Function Generator and Driver 86, & ITAT Control Panel 56, & ITAT Code Loading Device 88

These elements are similar in design to that used for these elements in the ITAT unit for interrogator systems (FIG. 1).

ITAT Operation

For ITAT operation, the switch 30 of the interrogator, and the switch 70 of each transponder would be set to the ITAT position. This is in accordance with agreed upon procedure.

An ITAT cycle of operation is initiated (ref. FIG. 1) when the interrogator unit 12 provides an interrogation pretrigger, and an ITAT cycle start trigger. Both signals are interfaced through an external connection to the timing and control (T&C) circuitry 28 in the ITAT unit. These signals will in most applications be initiated automatically, but there could be a manual pushbutton for initiation of a cycle. The T&C 38, after receiving the pretrigger and start trigger, in turn supplies a trigger to the ITAT modulator function generator and driver 46 to initiate the modulation function. The T&C 28 also has operated switches 32 and 34 to the path for modulator 36. The interrogator unit 12 emits a normal beacon interrogation signal, which passes through switch 32 to modulator 36. The ITAT function generated in unit 46 causes ITAT modulation to be added to the interrogation signal by activating modulator 36. An ITAT code is supplied to the function generator 46 through the loading device 48 and via the T&C 28. The modulated signal continues through switch 34 and coupler 42 to antenna 14. This completes an ITAT mode interrogation cycle. The T&C 28 causes the switches 32 and 34 to reinsert the attenuator 38.

Transponders within the interrogator antenna beamwidth and range will receive the ITAT Mode interrogation signal. In FIG. 2, the signal at antenna 54 is split into two parts by the coupler 82. One path is through attenuator 78 to the transponder 52. Because of the attentuation, the signal will be too weak except at very short range. Thus, the transponder 52 is desensitized, and furthermore normally would not be able to process the signal with ITAT modulation.

The other path for the incoming ITAT interrogation signal from the antenna 54 is via the 10 dB forward direction of coupler 84 to the ITAT receiver 60. The receiver 60 detects the ITAT modulated radio frequency signal. An ITAT code (e.g., the code of the day) is supplied from loading device 88 through the code accept port 87 to the correlator code generator 66. The signal correlator 62 is set to provide a matched filter function by the correlator code generator 66 which causes detection of the ITAT modulation and also provides a baseband digital signal. This signal is decoded in pulse signal decoder 64 and passed to the timing and control circuitry (T&C) 58 to indicate that an ITAT interrogation has been received.

The T&C 58, recognizing reception of an appropriate ITAT signal, triggers the interrogation signal generator 70 to generate a normal mode interrogation radio frequency signal. This signal is forwarded via the 10 dB path of coupler 84 and the 30 dB reverse direction of coupler 82. The signal then proceeds via the direct path of coupler 82 and switch 72, via attenuator 78 and switch 74 to the transponder 52. The transponder recognizes the interrogation which now appears normal and creates a normal reply. In the meantime, switches 72 and 74 are operated to the modulator 76 position, in response to signals from the T&C 58. The T&C 58 also activates the ITAT modulator function generator and driver 86, which via the power modulator 76 applies the appropriate ITAT modulation to the transponder reply. The proper code is supplied to the function generator 86 from the loading device 88 via the T&C 58. The signal then is transmitted via switch 72, coupler 82, and antenna 54.

This signal is received at the interrogator antenna 14 (FIG. 1), and is split two ways at coupler 42. The path via switches 32 and 34 is at this time via attenuator 38 to the interrogator unit 12. Because of the attenuation, this signal is difficult to detect.

The primary route from coupler 42 is via the coupler 42 direct path to the ITAT receiver 20, which detects the ITAT reply radio frequency signal. The signal is matched filter detected in the ITAT signal correlator 22 in cooperation with the correlation code generator 26, using an ITAT code (e.g., the code of the day) supplied from loading device 48 via the code accept port 47. The signal is then decoded by the pulse signal decoder 24 and forwarded to the T&C 28. The T&C 28 sends a stimulus to the replay signal generator 40. The reply signal generator 40 creates a normal beacon reply, which goes through coupler 44 (10 dB), coupler 42 (30 dB), switch 34, attenuator 38, and switch 32, to the interrogator unit 12.

NORMAL MODULATION EXAMPLE

Figure 3:
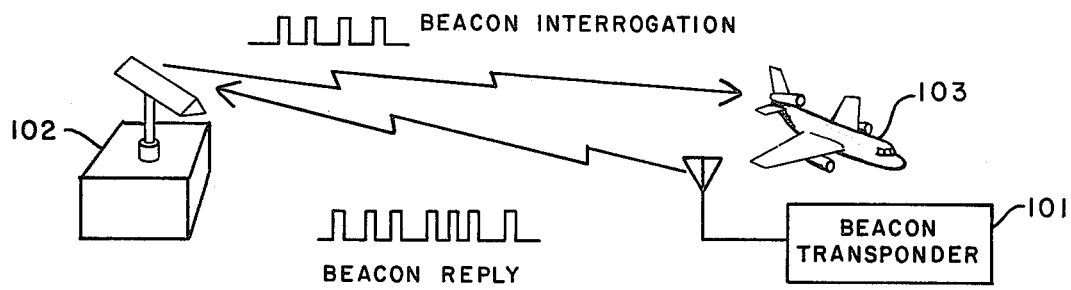
FIGS. 3 and 4 are pictorial representations, respectively, of a prior art and ITAT systems.

FIG. 3 is a pictorial representation of a typical prior art beacon system. Such systems are typically used for secondary radar surveillance, target tracking, and air traffic control. The interrogator unit 102 directs an interrogation to the transponder 101 of aircraft 103. The transponder replies with a coded radio frequency reply signal which indicates the aircraft identity, altitude, or other data code. This is generally similar to the well known currently in use systems used by the Federal Aviation Agency for air traffic control, by the Department of Defense for secondary radar surveillance or Identification, Friend or Foe (IFF), or other applications of these system principles.

ITAT MODULATION SUMMARY AND EXAMPLE

In this invention, Identification Technique for Air Traffic (ITAT) receiver-decoder units are inserted in the radio frequency networks between the interrogator unit and the aircraft transponder unit and their respective antennas. ITAT provides a means to add additional operating modes in the beacon system in a relatively simple and economical manner. The ITAT technique permits the adding of special modulation to the normal pulsed emissions of the beacon system in order to achieve a security identification code, or a digital waveform enabling high signal processing gain, or both. The ITAT receiver-decoder unit also permits the detection of the specially-modulated emissions and provides signal conversion for utilization by the beacon system.

Figure 4:
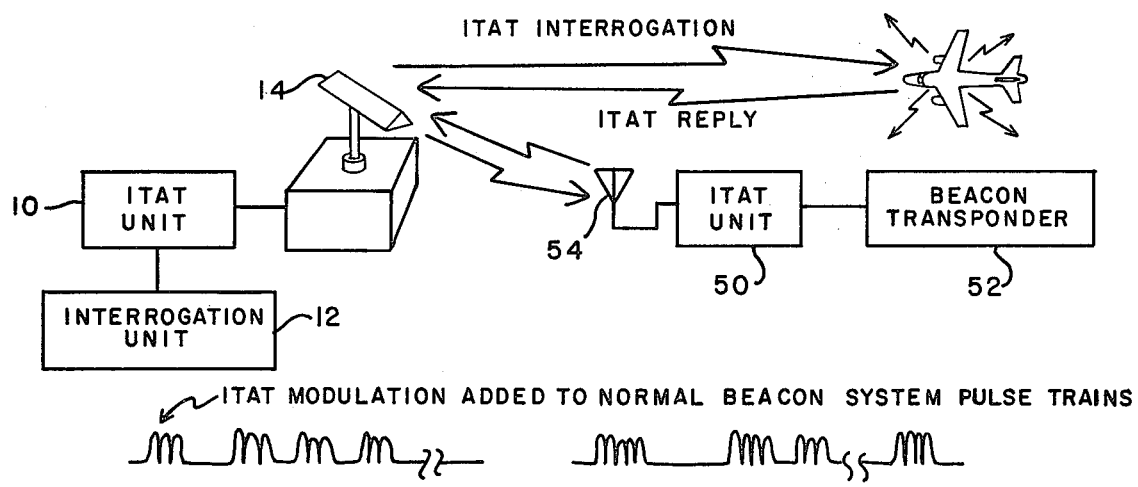

The basic operation of the ITAT mode is shown in FIG. 4. When the operators select the ITAT mode of operation, the emission from the interrogator unit is specially-modified to add special modulation to the normal pulse train. This modulation may be to add special extra identifying characteristics or to alter the basic pulse train to enable higher signal detection processing gain. The ITAT unit on the transponder-equipped aircraft is programmed to recognize the special added ITAT modulation (the transponder is not designed to recognize special added modulation). Once the ITAT unit on the aircraft has sensed an ITAT interrogation, it generates a normal beacon system interrogation signal which is sent to the transponder. The transponder generates a pulsed reply signal to each interrogation signal received. As the transponder reply signal travels through the ITAT unit, special ITAT modulation is added. The ITAT unit at the interrogator unit senses all ITAT-modulated replies received from aircraft which have been interrogated. For each ITAT reply received, the ITAT unit generates a normal beacon system transponder reply signal which is sent to the interrogator unit for processing.

The system operators each have an ITAT control panel which permits them to deselect the ITAT mode and to select normal system operation. In the normal mode, the ITAT units do not interfere with system operation and no special modulation is added to interrogation and reply signals.

As described herein in the detailed explanation of the ITAT receiver-decoder units, the ITAT technique causes signal attention to be placed in the normal beacon system signal paths which reduces or prevents normal beacon system operation when the ITAT operating mode is selected.

It is to be noted that the invention is comprised of a system of well known components. The electronic circuits for performing the functions indicated by the blocks in FIGS. 1 and 2 are well known conventional circuits using conventional components. Such circuits are commonly found in transponders and interrogators built by several manufacturers for the Air Traffic Control Radar Beacon System (ATCRBS) and military Identification, Friend or Foe systems. The circuits of the oscillator as illustrated schematically in FIG. 10 and the modulator as illustrated schematically in FIG. 11 of U.S. Pat. No. 4,161,729, are examples, but are not to be considered critical or limiting to the scope of the invention, as other circuits of oscillators and modulators performing the indicated function may satisfactorily be utilized.

I claim:

1. In an interrogator-transponder beacon system having an interrogator cooperating with an antenna and a transponder cooperating with an antenna, the improvement comprising an identification technique (ITAT) comprising an interrogator add-on unit coupled between the interrogator and its antenna, and a transponder add-on unit coupled between the transponder and its antenna;

wherein said interrogator add-on unit comprises control means including means to manually select either a normal mode of operation or an ITAT mode; apparatus effective during the ITAT mode which includes means to add special modulation to an interrogator output radio frequency signal, and means to pass the interrogator signal with said special modulation to the interrogator antenna; wherein said transponder add-on unit includes control means to select either a normal mode or an ITAT mode, and apparatus effective during the ITAT mode which includes means to route the interrogation signal received at the transponder unit to an ITAT receiver, means to detect the ITAT information, means to generate a normal interrogation which is forwarded to the transponder, which in a normal manner generates a reply, means to add special modulation to the transponder output radio frequency signal, and means to pass the transponder signal with said special modulation to the transponder antenna; wherein said interrogator add-on unit further includes means to route the transponder reply received at the interrogator antenna to an ITAT receiver, means to detect the ITAT information, and means to generate a normal transponder reply which is forwarded to the interrogator.

2. The apparatus as set forth in claim 1, wherein said interrogator add-on unit and said transponder add-on unit, in each, said means to detect the ITAT information includes a signal correlator having a matched filter, a correlation code generator, and an ITAT code loading device for loading a changeable code.

3. The apparatus as set forth in claim 2, wherein said interrogator add-on unit and said transponder add-on unit, in each, said means to add special modulation includes an ITAT modulator function generator and driver, which drives a high powered modulator, and timing and control circuitry which controls the operation.

4. The apparatus as set forth in claim 3, wherein said interrogator add-on unit and said transponder add-on unit, in each, there is further included an attenuator coupled via one R.F. switch and a first directional coupler to the antenna and via another R.F. switch to the interrogator or transponder, said R.F. switches having an attenuator position connecting the attenuation into the circuit and an alternative modulator position connecting the high power modulator into the circuit, the R.F. switches being controlled by the timing and control circuitry to be in the attenuator position for the ITAT mode except when the special modulation is being added for transmission to the antenna;

and a second directional coupler having a first port connected to a 10dB forward, 30 dB reverse port of the first directional coupler, a second port for a 10 dB forward 30 dB reverse path connected to the ITAT receiver, and a third port for a direct path connected to a normal interrogation or reply signal generator.

5. In an interrogator-transponder beacon system having an interrogator cooperating with an antenna and a transponder cooperating with an antenna, the improvement, an identification technique for air traffic (ITAT), for providing a means to add special operating modes and waveforms to these systems without system modifications except to add a small ITAT receiver-decoder unit in the cabling line to the antenna and a small control unit, said improvement comprising:

a. means including first modulation means cooperating with the interrogator and antenna to add desired modulation to interrogator output radio frequency signals, controlled by first timing and control means, b. means for causing the interrogator signal with added desired modulation to be passed to the associated interrogator antenna, c. the first timing and control means being operative when normal operation is desired to inhibit the first modulation means so that the interrogator and antenna are effectively coupled to permit the interrogator to operate normally in the beacon system, d. means cooperating with the interrogator and antenna to reduce system sensitivity to normal beacon system signals when desired, e. means for the beacon system operator to select and deselect special operating modes as desired without modifications to the system once the improvement is installed, f. means for the beacon system operator to externally insert and operate desired added special operating modes and waveforms once the improvement is installed, g. means including second modulation means cooperating with the transponder and antenna to add desired modulation to transponder output radio frequency signals, controlled by second timing and control means, h. means for causing the transponder signal with added desired modulation to be passed to the associated transponder antenna, i. the second timing and control means being operative when normal operation is desired to inhibit the second modulation means so that the transponder and antenna are effectively coupled to permit the transponder to operate normally in the beacon system, j. means cooperating with the transponder and antenna to reduce system sensitivity to beacon system signals when desired, k. interrogation signal generator means for generating a radio frequency signal for triggering the beacon system transponder to provide a normal transponder radio frequency information signal, controlled by the second timing and control means in response to reception of an interrogation, l. replay signal generator means for generating a radio frequency signal for providing the beacon system interrogator with a normal indication of a received beacon system transponder signal, controlled by the first timing and control means in response to a reception of a reply, m. whereby the add-on unit cooperating with the beacon system interrogator and antenna converts incoming transponder signals having added special modulation into a radio frequency signal format recognizable to the interrogator, n. whereby the add-on unit cooperating with the beacon system transponder and antenna converts incoming interrogation signals having added special modulation into a radio frequency signal format recognizable to the transponder.

* * * * *